(12) United States Patent
Wen

(10) Patent No.: US 11,634,862 B2
(45) Date of Patent: Apr. 25, 2023

(54) CABLE FOR BICYCLE

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 0 days.

(21) Appl. No.: 17/462,466

(22) Filed: Aug. 31, 2021

(65) Prior Publication Data

US 2022/0325472 A1 Oct. 13, 2022

(30) Foreign Application Priority Data

Apr. 13, 2021 (TW) ................................. 110113183

(51) Int. Cl.
*D07B 1/12* (2006.01)
*D07B 1/16* (2006.01)
*D07B 1/06* (2006.01)

(52) U.S. Cl.
CPC ............... *D07B 1/12* (2013.01); *D07B 1/06* (2013.01); *D07B 1/162* (2013.01); *D07B 2201/102* (2013.01); *D07B 2201/2009* (2013.01); *D07B 2201/2063* (2013.01); *D07B 2201/2088* (2013.01); *D07B 2201/2094* (2013.01); *D07B 2201/20903* (2015.07); *D07B 2205/2039* (2013.01); *D07B 2205/3071* (2013.01); *D07B 2501/2084* (2013.01)

(58) Field of Classification Search
CPC . D07B 1/06; D07B 1/12; D07B 1/162; D07B 2201/102; D07B 2201/2009; D07B 2201/2063; D07B 2201/2088; D07B 2201/20903; D07B 2201/2094
See application file for complete search history.

(56) References Cited

U.S. PATENT DOCUMENTS

| | | | | |
|---|---|---|---|---|
| 3,764,779 A * | 10/1973 | Kadoya | ..................... | F16C 1/10 219/535 |
| 5,500,488 A * | 3/1996 | Buckel | ............... | H01B 11/1808 174/131 A |
| 10,764,541 B2 * | 9/2020 | Olsson | ..................... | H01B 3/47 |
| 2004/0222009 A1 * | 11/2004 | Blew | ..................... | H01B 3/441 174/11 OF |
| 2010/0258334 A1 * | 10/2010 | Akaike | .................. | H05K 1/038 174/126.1 |
| 2013/0170038 A1 * | 7/2013 | Sheng | ..................... | D07B 1/148 359/515 |
| 2015/0068357 A1 * | 3/2015 | Wen | ........................ | F16C 1/267 74/502.5 |
| 2018/0297663 A1 * | 10/2018 | Wen | ........................ | B62M 25/04 |

\* cited by examiner

*Primary Examiner* — Shaun R Hurley
(74) *Attorney, Agent, or Firm* — Muncy, Geissler, Olds & Lowe, P.C.

(57) ABSTRACT

A cable for a bicycle is provided, including: an inner tube, a metal layer, a woven layer and an outer layer. The metal layer includes at least one metal wire disposed around an outer periphery of the inner tube. The woven layer is disposed around an outer periphery of the metal layer and includes a plurality of yarn threads interlaced with one another. The outer layer is disposed around an outer periphery of the woven layer, and the plurality of yarn threads are partially embedded radially within the outer layer.

1 Claim, 6 Drawing Sheets

CABLE FOR BICYCLE

BACKGROUND OF THE INVENTION

Field of the Invention

The present invention relates to a cable for a bicycle.

Description of the Prior Art

Generally, a braking system and a gear shifting system of a bicycle is controlled by cables, and each of the cables includes an inner wire and a housing sleeved around the inner wire. The inner wire is disposed within the housing and slidable relative to the housing, and the housing provides moisture-proof effect and impact resistances to protect the inner wire.

Specifically, a conventional housing includes an inner tube, a metal layer disposed around the inner tube and at least one adhesive layer disposed around the metal layer, and the at least one adhesive layer is configured to fix the metal layer. However, when the housing is bent, a wire of the metal layer may be bent and radially urged the at least one adhesive layer, which may result in damage to the at least one adhesive layer due to excessive local pressure. In addition, the at least one adhesive layer has a monotonous appearance, which has poor visual effect and no positive effect to cycling safety.

The present invention is, therefore, arisen to obviate or at least mitigate the above-mentioned disadvantages.

SUMMARY OF THE INVENTION

The main object of the present invention is to provide a cable for a bicycle, which has good structural strength and is durable.

To achieve the above and other objects, the present invention provides a cable for a bicycle, including: an inner tube, a metal layer, a woven layer and an outer layer. The metal layer includes at least one metal wire disposed around an outer periphery of the inner tube. The woven layer is disposed around an outer periphery of the metal layer and includes a plurality of yarn threads interlaced with one another.

The outer layer is disposed around an outer periphery of the woven layer, and the plurality of yarn threads are partially embedded radially within the outer layer.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
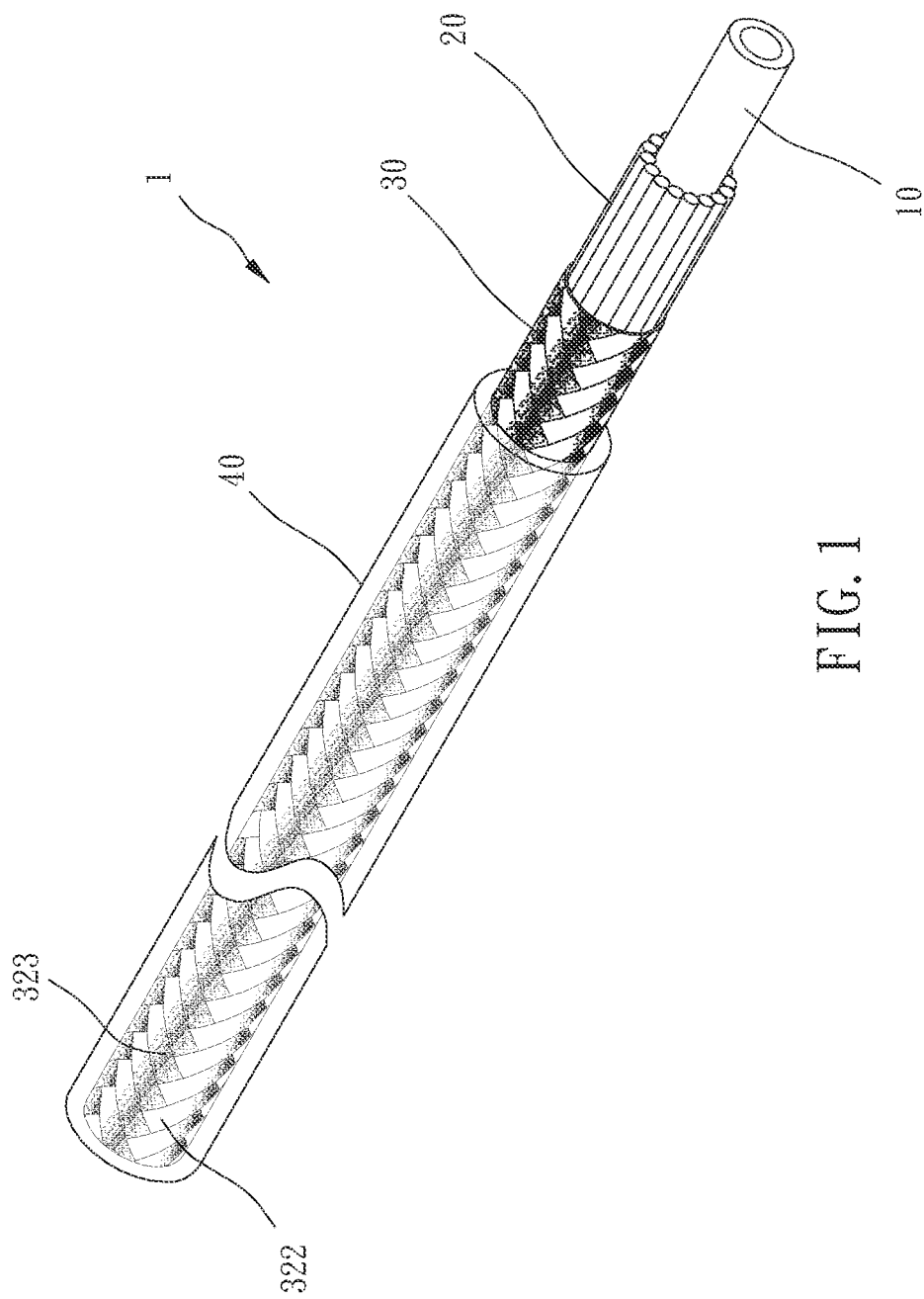
FIG. 1 is a stereogram of a preferable embodiment of the present invention.
Figure 2:
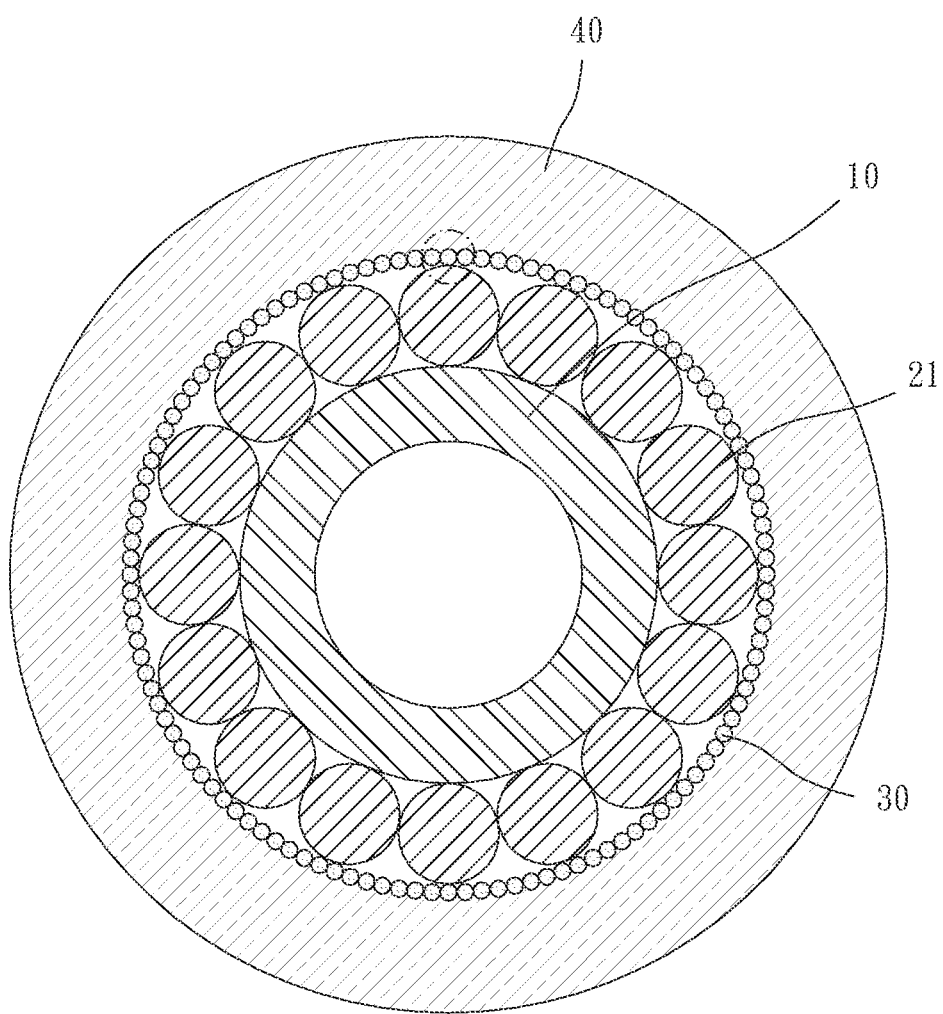
FIG. 2 is a cross-sectional view of a preferable embodiment of the present invention.
Figure 3:
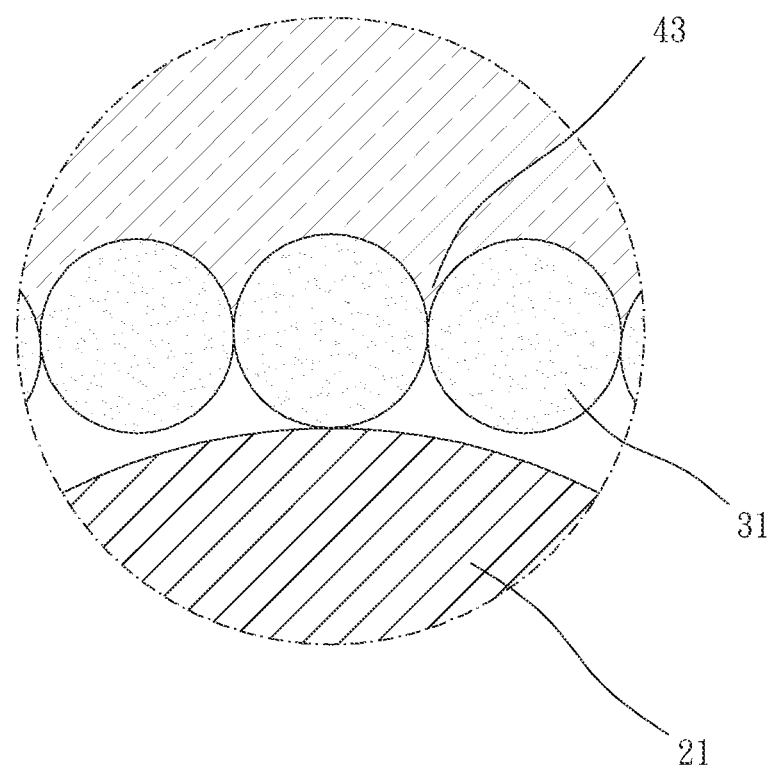
FIG. 3 is a partial enlargement of FIG. 2.
Figure 4:
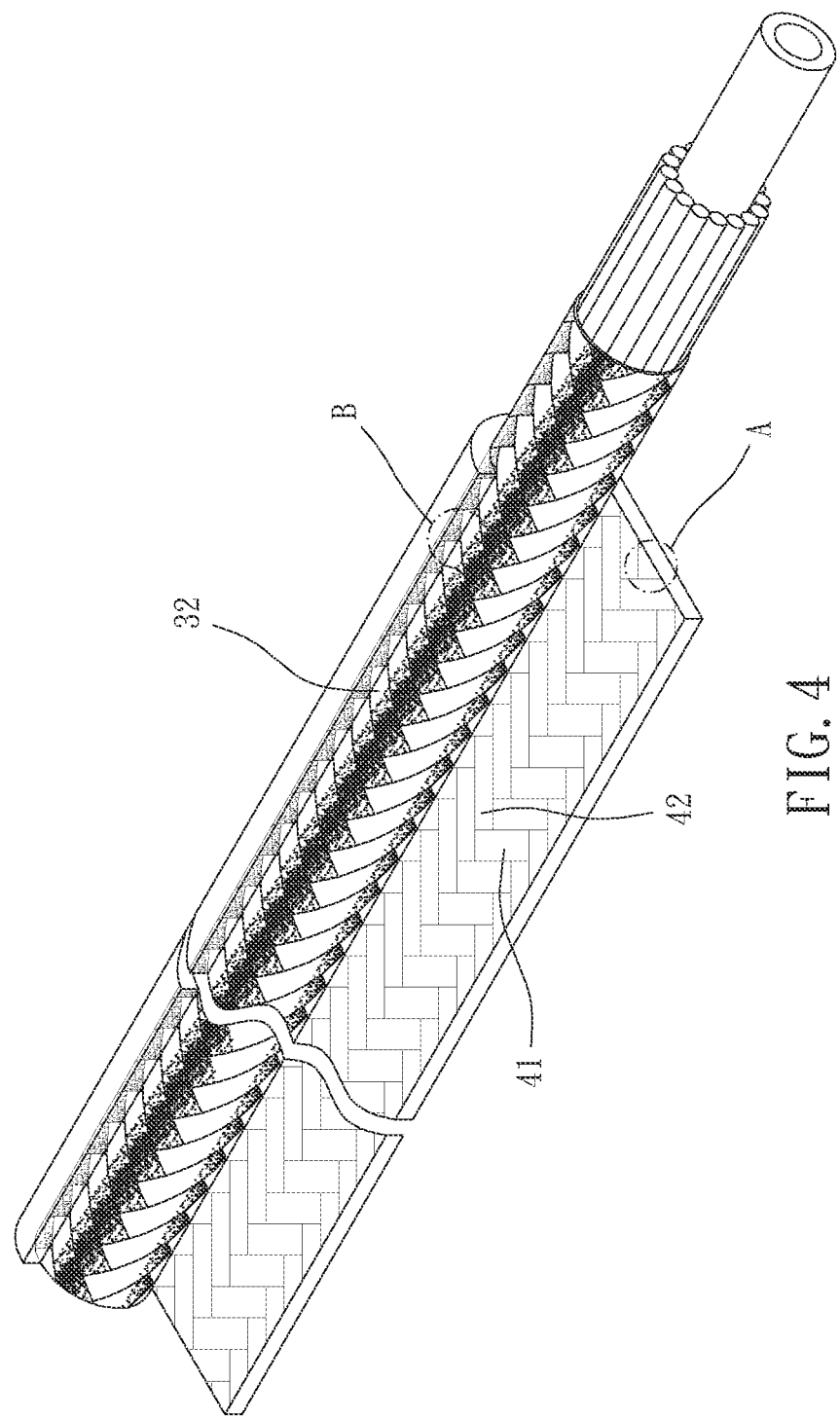
FIG. 4 is a stereogram of a preferable embodiment of the present invention when an outer layer is partially peeled off a woven layer.
Figure 5:
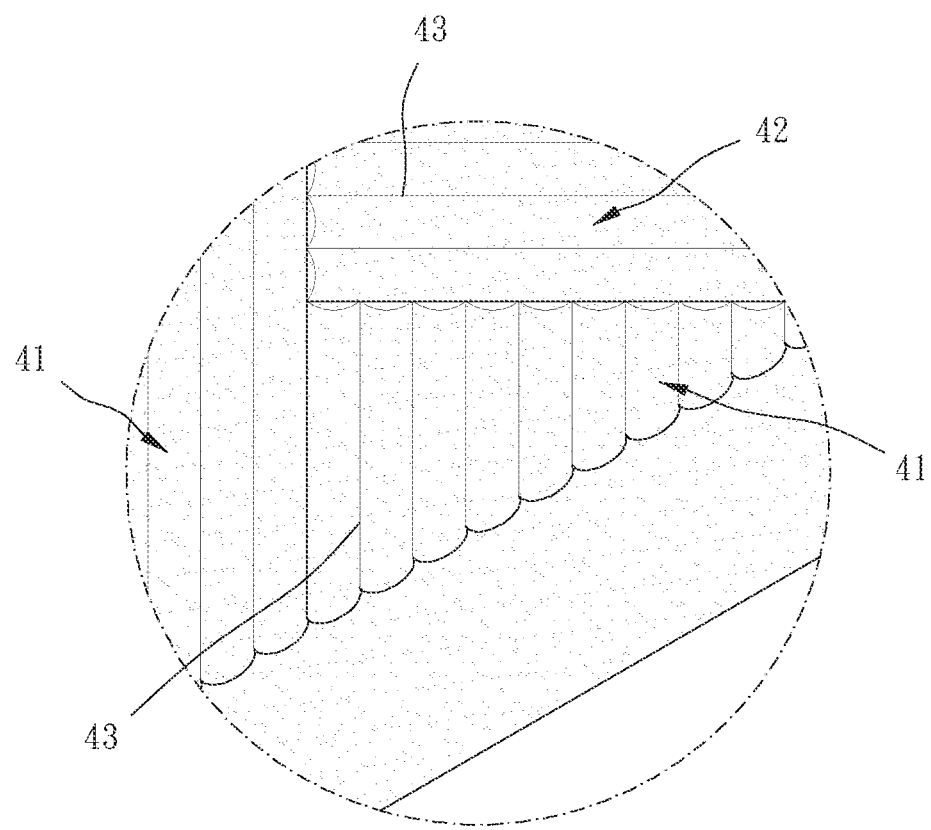
FIG. 5 is an enlargement of an A area of FIG. 4.
Figure 6:
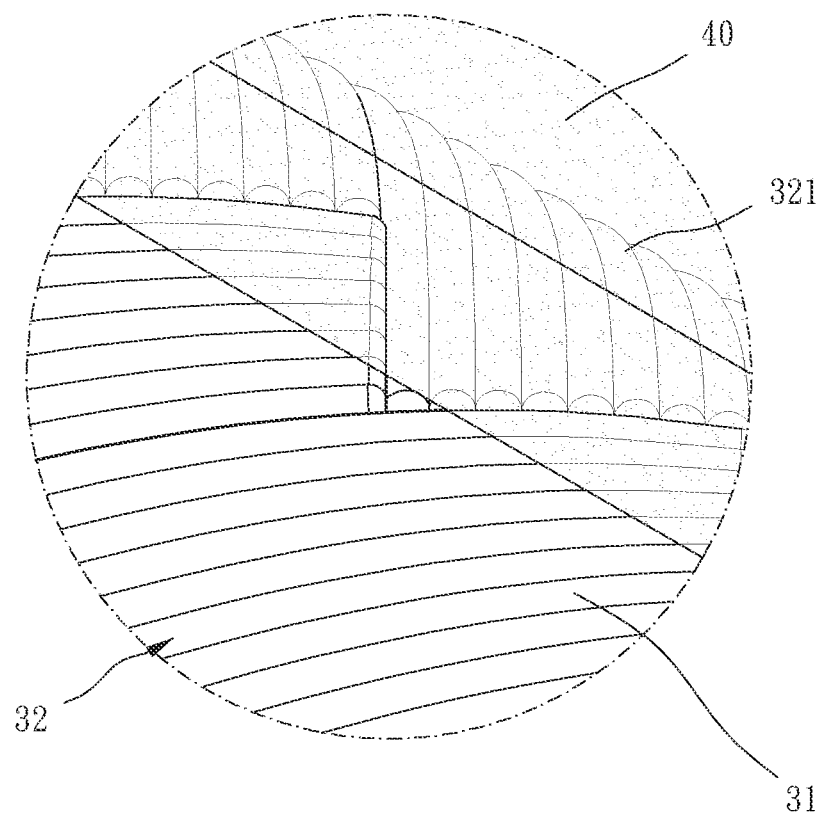
FIG. 6 is an enlargement of a B area of FIG. 4.

Please refer to FIGS. 1 to 6 for a preferable embodiment of the present invention. A cable 1 for a bicycle of the present invention includes an inner tube 10, a metal layer 20, a woven layer 30 and an outer layer 40.

The metal layer 20 includes at least one metal wire 21 disposed around an outer periphery of the inner tube 10. The woven layer 30 is disposed around an outer periphery of the metal layer 20 and includes a plurality of yarn threads 31 interlaced with one another. The outer layer 40 is disposed around an outer periphery of the woven layer 30, and the plurality of yarn threads 31 are partially embedded radially within the outer layer 40. The woven layer 30 has good toughness and can effectively disperse force exerted by the at least one metal wire 21 when the cable 1 is bent, and the metal layer 20 and the woven layer 30 are stably secured by the outer layer 40 to have good structural strength.

Preferably, each of the plurality of yarn threads 31 has a reflectivity which is larger than or equal to 30% in a wavelength range of visible light so that the plurality of yarn threads 31 provide a reflective effect and the woven layer 30 has a preferable appearance and benefits to cycling safety. The inner tube 10 defines an axial direction, and the woven layer 30 includes a plurality of plied yarns 32. Each of the plurality of plied yarns 32 includes at least one of the plurality of yarn threads 31, and a portion of the plurality of plied yarns 32 exposed to the outer layer 40 includes a plurality of arcuate convex portions 321 axially arranged side by side. As viewed along a direction oblique to the axial direction, each of the plurality of arcuate convex portions 321 partially forms a bright band 322 and partially forms a dark band 323 so as to generate a special visual effect. In this embodiment, each of the plurality of plied yarns 32 includes a plurality of said yarn threads 31 which are arranged side by side along an outer peripheral surface of the metal layer 20. Therefore, the woven layer 30 has an outer surface which is concave and convex regularly and has high weave density to effectively disperse the force exerted by the at least one metal wire 21 and prevent the outer layer 40 from directly pressing by the at least one metal wire 21. As viewed along the direction oblique to the axial direction, said bright bands 322 and said dark bands 323 of the plurality of arcuate convex portions 321 are circumferentially arranged alternatively so as to have a special visual effect. Specifically, the plurality of yarn threads 31 are glitter threads, and a diameter of each of the plurality of yarn threads 31 is between 0.03 mm and 0.1 mm (the diameter is 0.05 mm in this embodiment) so as to have high reflectivity and prevent the diameter to be too large to affect the reflection effect, which is eye-catching and improves cycling safety. However, the plurality of yarn threads may be made of other materials.

Preferably, a visible light transmittance of the outer layer 40 is larger than 50%, which allows light to transmit therethrough and reflected by the woven layer 30. The outer layer 40 is made of polypropylene, and an average thickness of the outer layer 40 is larger than or equal to an average thickness of the metal layer 20 so that the cable 1 has a smooth outer surface and good flexibility and toughness. The average thickness of the outer layer 40 is larger than an average thickness of the woven layer 30 so as to completely cover the woven layer 30. Specifically, an inner peripheral surface of the outer layer 40 includes a plurality of first arcuate concave portions 41 and a plurality of second arcuate concave portions 42. An extending direction of each of the plurality of first arcuate concave portions 41 and an extending direction of each of the plurality of the second arcuate concave portions 42 are oblique to the axial direction and different from each other, and each of the plurality of yarn threads 31 is partially embedded within at least one of the plurality of first arcuate concave portions 41 and the plurality of second arcuate concave portions 42 for stable connection. The plurality of first arcuate concave portions 41 are adjacently connected with one another and arranged along the axial direction, and the plurality of second arcuate concave portions 42 are adjacently connected with one another and arranged along the axial direction. Each of the plurality of first arcuate concave portions 41 and each of the plurality of the second arcuate concave portions 42 respectively include a plurality of ridge portions 43 spaced apart from one another, and each of the plurality of ridge portions 43 is embedded between two of the plurality of yarn threads 31 so as to be correspondingly connected with the plurality of arcuate convex portions 321 and reduce gaps between the woven layer 30 and the outer layer 40, which reduces refraction or scattering of light and provides good visual effect. In other embodiments, the outer layer may be made of other resins such as polyethylene, composite resin, etc.

An outer diameter of the cable 1 is between 4 mm and 4.5 mm. The inner tube 10 is made of polyethylene to provide smooth movement of an inner wire. An inner diameter of the inner tube 10 is between 1.5 mm and 2.0 mm so as to be suitable for various inner wires with different diameters. The metal layer 20 includes a plurality of said metal wires 21, and an outer peripheral surface of each of the plurality of said metal wires 21 has a zinc-containing material so as to avoid rusting. For example, when a diameter of each of the plurality of said metal wires is 0.5 mm, a number of the plurality of said metal wires is 18; and when the diameter of each of the plurality of said metal wires is 0.45 mm, the number of the plurality of said metal wires is 16, which is adjustable according to manufacturing requirements. In other embodiments, the metal layer may be formed by a single metal wire spirally disposed around the inner tube.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A cable for a bicycle, including:
   an inner tube;
   a metal layer, including at least one metal wire disposed around an outer periphery of the inner tube;
   a woven layer, disposed around an outer periphery of the metal layer, including a plurality of yarn threads interlaced with one another; and
   an outer layer, disposed around an outer periphery of the woven layer, the plurality of yarn threads partially embedded radially within the outer layer;
   wherein the inner tube defines an axial direction, the woven layer includes a plurality of plied yarns, each of the plurality of plied yarns includes at least one of the plurality of yarn threads, a portion of the plurality of plied yarns exposed to the outer layer includes a plurality of arcuate convex portions axially arranged side by side, and as viewed along a direction oblique to the axial direction, each of the plurality of arcuate convex portions partially forms a bright band and partially forms a dark band;
   wherein as viewed along the direction oblique to the axial direction, said bright bands and said dark bands of the plurality of arcuate convex portions are circumferentially arranged alternatively;
   wherein each of the plurality of plied yarns includes a plurality of said yarn threads which are arranged side by side along an outer peripheral surface of the metal layer; an average thickness of the outer layer is larger than an average thickness of the woven layer; the metal layer includes a plurality of said metal wires, an outer peripheral surface of each of the plurality of said metal wires has a zinc-containing material; each of the plurality of yarn threads is a glitter thread and has a reflectivity which is larger than or equal to 30% in a wavelength range of visible light, and a diameter of each of the plurality of yarn threads is between 0.03 mm and 0.1 mm; an inner peripheral surface of the outer layer includes a plurality of first arcuate concave portions and a plurality of second arcuate concave portions, an extending direction of each of the plurality of first arcuate concave portions and an extending direction of each of the plurality of second arcuate concave portions are oblique to the axial direction and different from each other, and each of plurality of yarn threads is partially embedded within at least one of the plurality of first arcuate concave portions and the plurality of second arcuate concave portions; each of the plurality of first arcuate concave portions and each of the plurality of second arcuate concave portions respectively include a plurality of ridge portions spaced apart from one another, and each of the plurality of ridge portions is embedded between two of the plurality of yarn threads; the plurality of first arcuate concave portions are adjacently connected with one another and arranged along the axial direction; the plurality of second arcuate concave portions are adjacently connected with one another and arranged along the axial direction; a visible light transmittance of the outer layer is larger than 50%; the inner tube is made of polyethylene; the outer layer is made of polypropylene; an outer diameter of the cable is between 4 mm and 4.5 mm; and the average thickness of the outer layer is larger than or equal to an average thickness of the metal layer.

* * * * *